(12) United States Patent
Xiao et al.

(10) Patent No.: US 11,333,319 B2
(45) Date of Patent: May 17, 2022

(54) OPTICAL APPARATUS AND ILLUMINATING MODULE THEREOF

(71) Applicants: Sintai Optical (Shenzhen) Co., Ltd., ShenZhen (CN); Asia Optical Co., Inc., Taichung (TW)

(72) Inventors: Yung-Neng Xiao, Taichung (TW); Ru-Ping Huang, Taichung (TW); Chien-Chih Hsiung, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 17/301,303

(22) Filed: Mar. 31, 2021

(65) Prior Publication Data
US 2021/0215315 A1 Jul. 15, 2021

Related U.S. Application Data

(63) Continuation of application No. 16/800,183, filed on Feb. 25, 2020, now Pat. No. 11,015,783.

(30) Foreign Application Priority Data

Mar. 21, 2019 (CN) .......................... 201910230261.5

(51) Int. Cl.
*F21V 5/04* (2006.01)
*G02B 27/30* (2006.01)
*G02B 3/00* (2006.01)

(52) U.S. Cl.
CPC ............ *F21V 5/048* (2013.01); *G02B 3/0037* (2013.01); *G02B 27/30* (2013.01)

(58) Field of Classification Search
CPC ....... F21V 5/048; G02B 3/0037; G02B 27/30; G02B 2027/0121; G02B 27/0101;
(Continued)

(56) References Cited

U.S. PATENT DOCUMENTS 9,479,767 B2 ‡ 10/2016 Van Der Horst .... H04N 13/117
9,658,456 B2 ‡ 5/2017 Mukawa .................. G02B 5/32
(Continued)

FOREIGN PATENT DOCUMENTS

| CN | 102004312 A | 4/2011 |
|---|---|---|
| CN | 102375235 A | 3/2012 |

(Continued)

*Primary Examiner* — Donald L Raleigh
(74) *Attorney, Agent, or Firm* — McClure, Qualey & Rodack

(57) ABSTRACT

An illuminating module includes a light source assembly which includes a first lens unit. The light source assembly is configured to produce an illuminating beam, wherein the optical apparatus includes an optical modulation module and a light guiding module, the optical modulation module is parallel corresponding to the first lens unit, the illuminating beam passes through the optical modulation module to be an image beam having an image, and the image beam travels in the light guiding module, and leaves the light guiding module. The illuminating beam obliquely enters the optical modulation module.

16 Claims, 4 Drawing Sheets

(58) Field of Classification Search
CPC ............ G02B 27/0172; G02B 27/0961; G02B 27/126; G02B 27/0018; G03B 21/14
See application file for complete search history.

(56) References Cited

U.S. PATENT DOCUMENTS

| | | | | |
|---|---|---|---|---|
| 9,753,284 | B2 ‡ | 9/2017 | Machida | G02B 27/0172 |
| 9,766,453 | B2 ‡ | 9/2017 | Mukawa | G02B 27/0101 |
| 2005/0140644 | A1* | 6/2005 | Mukawa | G02B 5/32 345/156 |
| 2008/0191604 | A1 ‡ | 8/2008 | Morris | B82Y 20/00 313/499 |
| 2010/0118411 | A1 ‡ | 5/2010 | Nakajima | G02B 27/0961 359/639 |
| 2016/0018658 | A1 ‡ | 1/2016 | Machida | G02B 27/0176 345/207 |
| 2017/0343186 | A1 ‡ | 11/2017 | Wang | G02B 27/283 |
| 2020/0400962 | A1 ‡ | 12/2020 | Hirano | G06F 3/14 |

FOREIGN PATENT DOCUMENTS

| | | | | |
|---|---|---|---|---|
| CN | 102540661 A | | 7/2012 | |
| CN | 102809821 B | ‡ | 12/2012 | ......... G02B 27/0176 |
| CN | 102809821 B | | 12/2012 | |
| CN | 104067159 B | ‡ | 9/2014 | ........... G02B 26/101 |
| CN | 104067159 B | | 9/2014 | |
| CN | 104076516 A | | 10/2014 | |
| CN | 104204905 B | | 12/2014 | |
| CN | 104204905 B | ‡ | 12/2014 | ........... G02B 3/0056 |
| CN | 104272733 A | ‡ | 1/2015 | ........... H04N 13/376 |
| CN | 104272733 A | | 1/2015 | |
| CN | 108873326 A | | 11/2018 | |
| KR | 1020130019191 | | 2/2013 | |
| TW | 580591 B | | 3/2004 | |
| TW | 201221999 A | | 6/2012 | |
| TW | 201221999 A | ‡ | 6/2012 | |

\* cited by examiner
‡ imported from a related application

OPTICAL APPARATUS AND ILLUMINATING MODULE THEREOF

CROSS REFERENCE TO RELATED APPLICATIONS

This application is a continuation application of pending U.S. patent application Ser. No. 16/800,183, filed Feb. 25, 2020 and entitled "Optical Apparatus and Illuminating Module Thereof".

BACKGROUND OF THE INVENTION

Field of the Invention

The invention relates to an optical apparatus and illuminating module thereof, and more particularly to an optical apparatus capable of producing image, and the illuminating module of the optical apparatus.

Description of the Related Art

Generally, an optical apparatus includes an illuminating module and an optical modulation module. For convenience in design, the light beam emitted by the illuminating module is configured to vertically enter the optical modulation module. However, such design causes numerous reflections between the optical modulation module and the next optical elements (e.g. light guiding element), and the output image of the optical apparatus are liable to image ghosting that affects the viewing quality of the optical apparatus.

BRIEF SUMMARY OF THE INVENTION

The invention provides an optical apparatus and illuminating module thereof. The optical apparatus is configured to produce an image, and a light beam emitted by the illuminating module travels in a direction which intersects a central axis of the illuminating module at an angle, so as to avoid appearance of image ghosting.

The illuminating module for an optical apparatus in accordance with an embodiment of the invention includes a light source assembly and a first lens unit. The light source assembly is configured to produce a light beam, wherein the light beam has a first central optical axis. The first lens unit has a first lens optical axis, wherein the light beam passing through the first lens unit is formed to be an illuminating beam, the illuminating beam has a second central optical axis, and the second central optical axis intersects with the first lens optical axis. The optical apparatus includes an optical modulation module and a light guiding module, the illuminating beam passes through the optical modulation module to be an image beam having an image, and the image beam travels in the light guiding module, leaves the light guiding module and is received by user's eyes.

In another embodiment, the first lens optical axis intersects with the first central optical axis or the first lens optical axis and the first central optical axis are in parallel without coinciding with each other so that the second central optical axis intersects with the first lens optical axis.

In yet another embodiment, an angle at which the second central optical axis intersects with the first lens optical axis satisfies the following condition 3 degrees$\leq \theta \leq$8 degrees, where $\theta$ is the angle at which the second central optical axis intersects with the first lens optical axis.

In another embodiment, the optical modulation module includes a second lens unit, the second lens unit has a second lens optical axis, the image beam outputted by the optical modulation module has a third central optical axis, the second lens optical axis and the third central optical axis are in parallel and are spaced a distance on an incident plane or intersect with each other.

In yet another embodiment, when the second lens optical axis and the third central optical axis are in parallel and are spaced the distance on the incident plane, the distance satisfies the following condition $\alpha'=\tan^{-1}(S/G)$, where $\alpha'$ is the incident angle at which the image beam enters the light guiding module, S is the distance at which the second lens optical axis and the third central optical axis are spaced, and G is a focal length of the second lens unit.

In another embodiment, the optical modulation module includes a second lens unit, the second lens unit has a second lens optical axis, the image beam outputted by the optical modulation module has a third central optical axis, and the second lens optical axis and the third central optical axis intersect with each other.

In yet another embodiment, the image beam enters the light guiding module at an incident angle, and the incident angle satisfies the following condition 0 degrees$<\alpha<$90 degrees, where $\alpha$ is the incident angle at which the image beam enters the light guiding module.

In another embodiment, the image beam enters the light guiding module at an incident angle, and the incident angle satisfies the following condition 0 degrees$<\alpha<$10 degrees, where $\alpha$ is the incident angle at which the image beam enters the light guiding module.

In yet another embodiment, the light source assembly includes a light source, a collimated element, a light uniformizer, a light valve and a beam combiner. The light source is configured to emit light. The collimated element is configured to collimate the light to be a collimated beam. The light uniformizer is configured to uniformize the collimated beam to be the light beam having the first central optical axis. The light valve is configured to add image information to the illuminating beam to produce the image beam. The beam combiner is configured to guide the illuminating beam from the illuminating module to the light valve and guide the image beam from the light valve to the second lens unit. The second lens unit is configured to allow the image beam to pass through and project the image beam to the light guiding module.

In another embodiment, the light guiding module includes a diffraction-type light guiding plate.

In yet another embodiment, the image beam enters the light guiding module at an incident angle, and the incident angle satisfies the following condition 0 degrees$<\alpha<$1.5 degrees, where $\alpha$ is the incident angle at which the image beam enters the light guiding module.

In another embodiment, the optical modulation module includes a second lens unit, the second lens unit has a second lens optical axis, the image beam outputted by the optical modulation module has a third central optical axis, the second lens optical axis and the third central optical axis are in parallel and are spaced a distance on an incident plane, and the distance satisfies the following condition $\alpha'=\tan^{-1}(S/G)$, where $\alpha'$ is the incident angle at which the image beam enters the light guiding module, S is the distance at which the second lens optical axis and the third central optical axis are spaced, and G is a focal length of the second lens unit.

In yet another embodiment, the optical modulation module includes a second lens unit, the second lens unit has a second lens optical axis, the image beam outputted by the optical modulation module has a third central optical axis, and the second lens optical axis and the third central optical axis intersect with each other.

In another embodiment, the incident angle further satisfies the following condition 0 degrees<α<90 degrees, where α is the incident angle at which the image beam enters the light guiding module.

In yet another embodiment, the first lens optical axis and the first central optical axis are in parallel without coinciding with each other so that the second central optical axis intersects with the first lens optical axis.

In another embodiment, an angle at which the second central optical axis intersects with the first lens optical axis satisfies the following condition 3 degrees≤θ≤8 degrees, where θ is the angle at which the second central optical axis intersects with the first lens optical axis.

In yet another embodiment, the first lens optical axis intersects with the first central optical axis so that the second central optical axis intersects with the first lens optical axis.

In another embodiment, an angle at which the second central optical axis intersects with the first lens optical axis satisfies the following condition 3 degrees≤θ≤8 degrees, where θ is the angle at which the second central optical axis intersects with the first lens optical axis; the incident angle satisfies the following condition 0 degrees<α<1.5 degrees, where α is the incident angle at which the image beam enters the light guiding module; when the second lens optical axis and the third central optical axis are in parallel and are spaced the distance on the incident plane, the distance satisfies the following condition α'=tan$^{-1}$ (S/G), where α' is the incident angle at which the image beam enters the light guiding module, S is the distance at which the second lens optical axis and the third central optical axis are spaced, and G is a focal length of the second lens unit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

An optical apparatus in accordance with various embodiments of the invention at least includes an illuminating module, an optical modulation module and a light guiding module. The illuminating module is configured to produce an illuminating beam. The optical modulation module is configured to receive the illuminating beam and transform the illuminating beam to an image beam having an image. The image beam is obliquely incident to the light guiding module, in which the image beam propagates and is guided to leave the light guiding module. The image beam out of the light guiding module is then received by user's eyes. That is to say, the image beam is directed to user's eyes by the light guiding module.

The term "obliquely incident" means that when the image beam enters the light guiding module, a central optical axis of the image beam intersects with a normal line of an incident plane of the light guiding module at an angle (that is, an incident angle). The incident angle is great than 0 degrees and is smaller than 90 degrees. In such arrangement, appearance of image ghosting can be avoided and viewing quality of the optical apparatus can be improved.

The optical apparatus of the invention capable of eliminating the image ghosting effectively is described by following embodiments.

Figure 1:
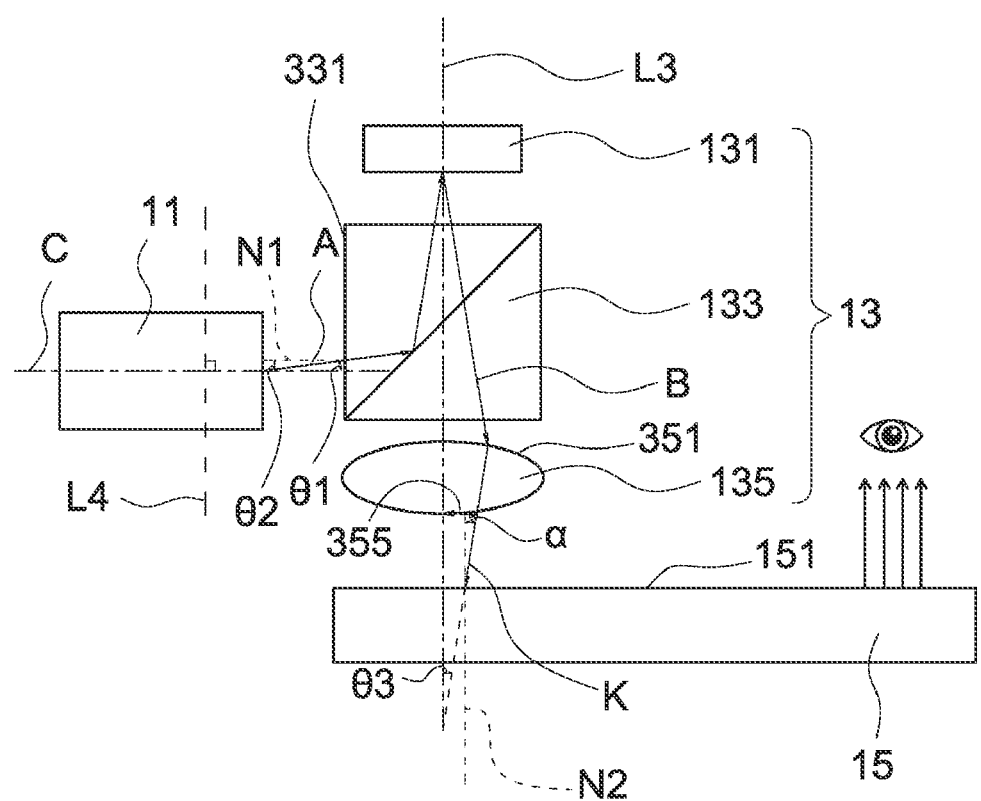
FIG. 1 is a schematic view of an optical apparatus in accordance with an embodiment of the invention.

Referring to FIG. 1, an optical apparatus 100 in accordance with an embodiment of the invention includes an illuminating module 11, an optical modulation module 13 and a light guiding module 15. The illuminating module 11 has a central axis C and is configured to produce an illuminating beam. The illuminating beam travels at a direction sloped with respect to the central axis C at an angle $θ_1$. That is to say, the illuminating beam has a central optical axis A, the central optical axis A intersects with the central axis C of the illuminating module 11 so that an angle therebetween substantially equals the angle $θ_1$. The optical modulation module 13 is configured to receive the illuminating beam from the illuminating module 11 and transform the illuminating beam to an image beam having an image and a central optical axis B. The light guiding module is configured to receive the image beam from the optical modulation module 13. The image beam propagates in the light guiding module 15, leaves the light guiding module 15, and is guided (or projected) to user's eyes. Therefore, the user can view the image of the image beam.

Figure 2:
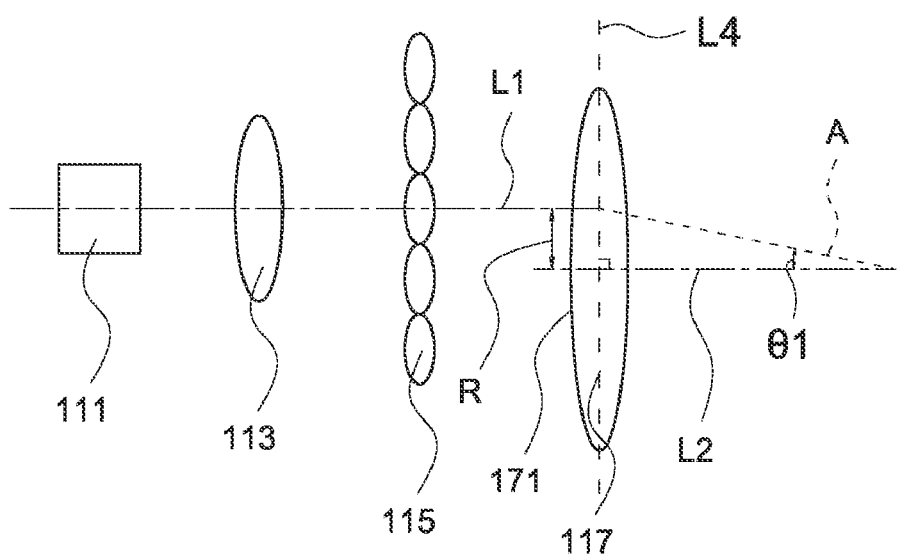
FIG. 2 is a schematic view of an illuminating module of FIG. 1.

Referring to FIG. 2, in the present or other embodiments, the illuminating module 11 includes a light source assembly and a first lens unit 117. The light source assembly is configured to produce a light beam having a central optical axis L1 and traveling towards the first lens unit 117. The first lens unit has a lens optical axis L2. The light beam from the light source assembly passes through the first lens unit 117 to form the illuminating beam having the central optical axis A. An axis L4 passing through the first lens unit 117 is perpendicular to the lens opticl axis L2. In the present or other embodiments, the lens optical axis L2 of the first lens unit 117 is the central axis C of the illuminating module 11. In the present or other embodiments, the light beam from the light source assembly can be arranged to enter the first lens unit 117 along different paths or in different ways, so that the central optical axis A of the illuminating beam leaving the first lens unit 117 intersects with the lens optical axis L2 of the first lens unit 117 at the angle $θ_1$.

The above-described light source assembly includes, for example, a light source 111, a collimated element 113 and a light uniformizer 115. The collimated element 113 can be disposed between the light source 111 and the light uniformizer 115.

During operation of the optical apparatus 100, the light source 111 produces light (not shown), and the light passes through the collimated element 113 and is collimated to be a collimated beam (not shown). The collimated beam is uniformized by the light uniformizer 115 to be the light beam that has the central optical axis L1, and the light beam enters the first lens unit 117. The lens optical axis L2 of the first lens unit 117 is substantially parallel to the central optical axis L1 but is not overlapped with the central optical axis L1. Therefore, the lens optical axis L2 and the central optical axis L1 are spaced a distance R (as shown in FIG. 2) on the incident plane 171 of the first lens unit 117 in a direction that is perpendicular to the lens optical axis L2 or the central optical axis L. In the present or other embodiments, the distance R satisfies the following condition: 0.5 mm≤R≤2 mm. However, the invention is not limited thereto. The light beam passing through the first lens unit 117 is formed into the illuminating beam that has the central optical axis A, and the central optical axis A intersects with the lens optical axis L2 at the angle $\theta_1$. In the present embodiment, the light produced by the light source 111 has a phenomenon of non-uniform distribution of energy. If the light directly enters the optical modulation module 13, then the image that is viewed by the user will have a problem of non-uniform distribution of brightness. By the design of the light uniformizer 115, the light produced by the light source 111 is uniformized before entering the optical modulation module 13 so that the optical apparatus 100 can avoid from the above-described problem. Furthermore, by the design of the light uniformizer 115 and the first lens unit 117, the light beam passing through the light uniformizer 115 and the first lens unit 117 is adjusted to have appropriate size (e.g. the size that fits following-described light valve 131 of the optical modulation module 13), so as to ensure that energy of the light beam is fully utilized by the optical modulation module 13.

As shown in FIG. 1, the optical modulation module 13 includes a light valve 131, a beam combiner 133 and a second lens unit 135. The illuminating beam produced by the illuminating module 11 enters the optical modulation module 13 at an angle $\theta_2$ through an incident plane 331, wherein the incident plane 331 is parallel to the axis L4 and has a normal line N1, and the central optical axis A intersects with the normal line N1 of the incident plane 331 at the angle $\theta_2$. In the present embodiment, the angle $\theta_2$ substantially equals the angle $\theta_1$. In another embodiment, the angle $\theta_2$ is not equal to the angle $\theta_1$. In the present or other embodiments, the angle $\theta_1$ satisfies the condition of 3 degrees≤$\theta_1$≤8 degrees. However, the invention is not limited thereto.

In detail, the illuminating beam enters the beam combiner 133 and is reflected to the light valve 131. The light valve 131 reflects the illuminating beam and adds image information (not shown) to the illuminating beam for producing the image beam that has the image. The image beam passes through the beam combiner 133 to have the central optical axis B, and enters the second lens unit 135. The second lens unit 135 has a lens optical axis L3. After the image beam having the central optical axis B enters the second lens unit 135, the second lens unit 135 refracts the image beam to the light guiding module 15. That is, the image beam having the central optical axis B passes through the second lens unit 135 and is refracted to have a central optical axis K. The central optical axis K of the image beam intersects with the lens optical axis L3 of the second lens unit 135 at an angle $\theta_3$, and the central optical axis K of the image beam and the lens optical axis L3 of the second lens unit 135 are spaced a distance on a light exiting plane 355. For convenience of description, only one lens and the corresponding path along which the image beam passes through the second lens unit 135 are shown in FIG. 1. However, it is understood by the person having ordinary skill in the art that the path along which the image beam passes through the second lens unit 135 will be different if the second lens unit 135 includes a plurality of lenses, and therefore the descriptions thereof are omitted. In the present or other embodiments, the angle $\theta_3$ is greater than 0 degrees. Actually, the image beam having the central optical axis K enters the light guiding module 15 at an incident angle α through an incident plane 151 of the light guiding module 15, wherein the incident plane 151 has a normal line N2, and the central optical axis K of the image beam intersects with the normal line N2 at the incident angle α. In the present or other embodiments, the incident angle α satisfies the condition of 0 degrees<α<1.5 degrees, however, the invention is not limited thereto. In the present embodiment, the lens optical axis L3 of the second lens unit 135 is substantially parallel to the normal line N2 of the incident plane 151 of the light guiding module 15 so that the angle $\theta_3$ substantially equals the incident angle α, however, the invention is not limited thereto. That is to say, in other embodiments, the lens optical axis L3 of the second lens unit 135 is not parallel to the normal line N2 of the incident plane 151 of the light guiding module 15 so that the angle $\theta_3$ does not equal the incident angle α.

Then, the image beam propagates in the light guiding module 15, is guided to leave the light guiding module 15, and travels towards user's eyes. In the present embodiment, the image beam propagates in the light guiding module 15 by way of diffraction, however, the invention is not limited thereto. For example, the image beam can propagate in the light guiding module 15 by way of total reflection. Alternatively, the image beam can propagate in the light guiding module 15 by way of total reflection and diffraction simultaneously.

Since the illuminating module 11 of the invention can produce the illuminating beam traveling in the direction that is sloped at the angle $\theta_1$ with respect to the central axis C of the illuminating module 11, the image beam obliquely enters the light guiding module 15 so that appearance of image ghosting can be avoided, and the small incident angle α is advantageous to maintenance of image quality. Moreover, by the design of the present embodiment, the optical modulation module 13 and the light guiding module 15 can be arranged parallel to each other. That is, the light exiting plane 355 of the optical modulation module 13 (that is, the light exiting plane on the second lens unit 135 which is perpendicular to the lens optical axis L3) is nearly parallel to the incident plane 151 of the light guiding module 15. Comparing to a general optical apparatus having the light engine and light guiding module sloped with respect to each other for eliminating image ghosting, the optical apparatus 100 of the invention has the advantages of reduced volume and easier design in system.

Figure 3:
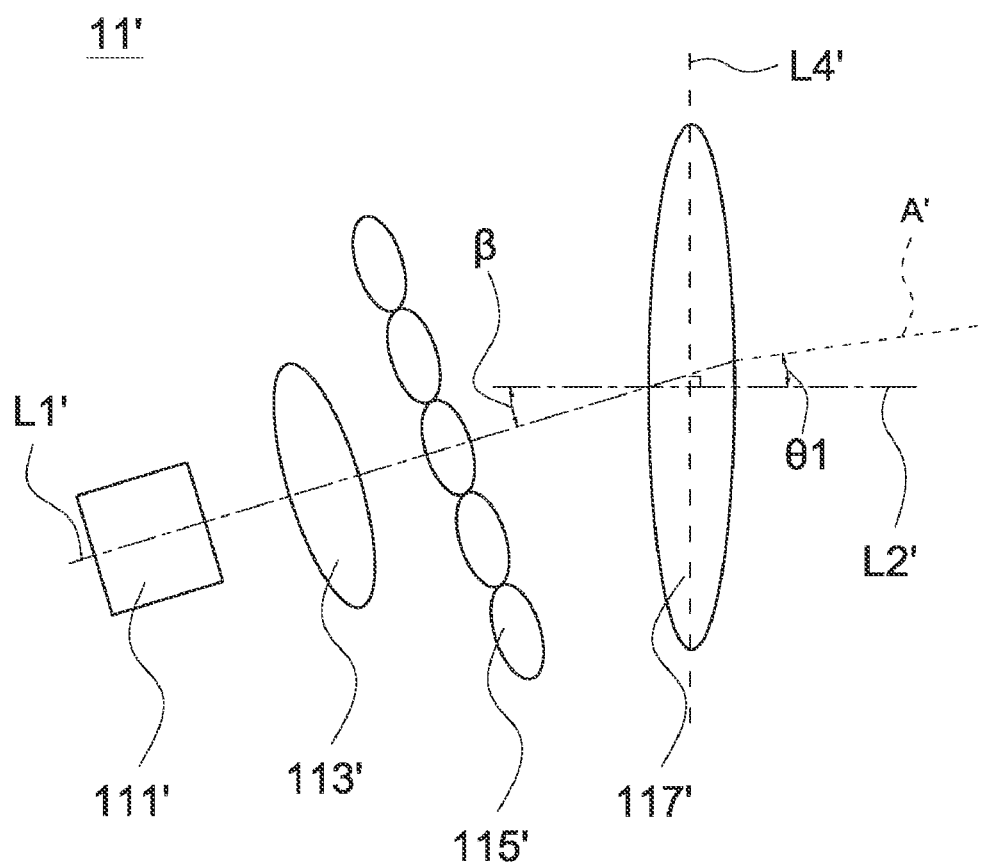
FIG. 3 is a schematic view of an illuminating module of an optical apparatus in accordance with another embodiment of the invention.

Referring to FIG. 3, in another embodiment, the light source assembly of the illuminating module 11' includes a light source 111', a collimated element 113' and a light uniformizer 115', wherein the collimated element 113' is disposed between the light source 111' and the light uniformizer 115'. The light source assembly is configured to produce a light beam (not shown), and the light beam has a central optical axis L1', and the first lens unit 117' has a lens optical axis L2'. An axis L4' passing through the first lens unit 117' is perpendicular to the lens optical axis L2' and is parallel to the incident plane of the optical modulation module. The central optical axis L1' intersects with the lens optical axis L2' at the angle β. During operation, when the light beam uniformized by the light uniformizer 115' enters the first lens unit 117' along the central optical axis L1', the light beam is formed into the illuminating beam having the central optical axis A' because the central optical axis L1' intersects with the lens optical axis L2'. The central optical axis A' intersects with the lens optical axis L2' at an angle $\theta_1$. The arrangement of other elements and operation of this embodiment are similar to those of the embodiment described above, and therefore the descriptions thereof are omitted.

Figure 4:
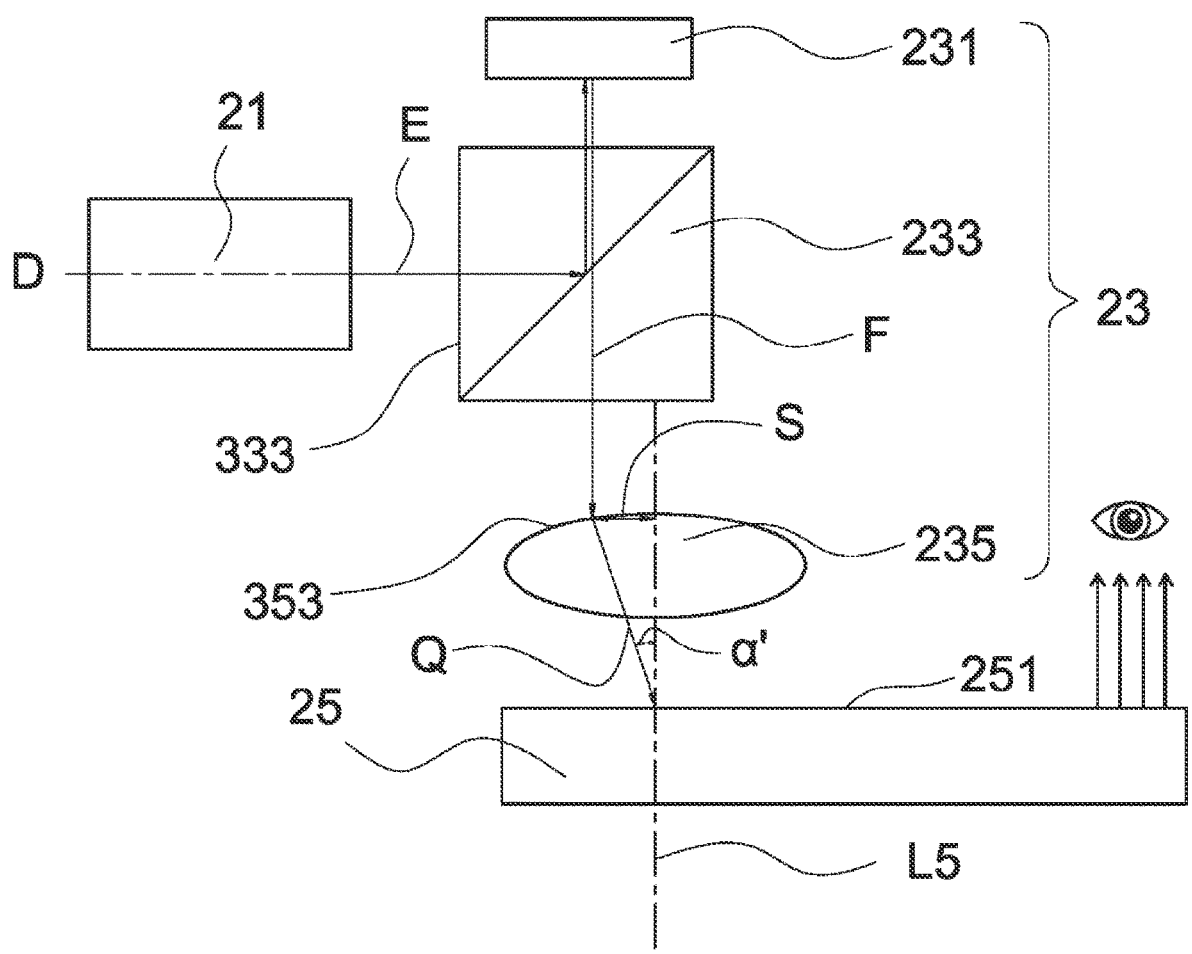
FIG. 4 is a schematic view of an optical apparatus in accordance with yet another embodiment of the invention.

Referring to FIG. 4, in yet another embodiment, an optical apparatus 200 of the invention includes an illuminating module 21, an optical modulation module 23 and a light guiding module 25. An illuminating beam produced by the illuminating module 21 travels along a central axis D of the illuminating module 21 and vertically enters the optical modulation module 23. That is to say, a central optical axis E of the illuminating beam substantially coincides with the central axis D of the illuminating module 21 and is substantially perpendicular to an incident plane 333 on the optical modulation module 23 that corresponds to the illuminating module 21. In the present embodiment, the illuminating module 21 can be designed according to actual application as long as the central optical axis E of the illuminating beam is substantially perpendicular to a light exiting plane of the illuminating module 21 (that is, substantially coincides with the central axis D). The invention can be implemented in any possible ways without limitations.

Moreover, the optical modulation module 23 of FIG. 4 is slightly different from that of FIG. 1 in the optical design. In FIG. 4, the image beam that passes through the light valve 231 and the beam combiner 233 of the optical modulation module 23 and travels towards the second lens unit 235 has a central optical axis F. The second lens unit 235 of the optical modulation module 23 has a lens optical axis L5, and the central optical axis F and the lens optical axis L5 are substantially parallel to each other rather than coincide with each other. That is to say, the central optical axis F and the lens optical axis L5 are substantially parallel to each other and spaced a distance S in a direction that is perpendicular to the central optical axis F or the lens optical axis L5. Therefore, after passing through the second lens unit 235, the image beam is refracted to have a central optical axis Q, so as to enter the light guiding module 25 at an incident angle α' through an incident plane 251 of the light guiding module 25. As long as the incident angle α' is in a predetermined range, the image ghosting caused by reflection of the light guiding module 25 can be eliminated. For example, the incident angle α' satisfies the following conditions: 5 degrees<α'<10 degrees and α'=tan$^{-1}$ (S/G), where S is the vertical distance between the central optical axis F and the lens optical axis L5, and G is a focal length of the second lens unit 235. In the present or other embodiments, the distance S preferably ranges from 0 to 3 mm, and the focal length G preferably ranges from 2.5 to 15 mm, however, the invention is not limited thereto.

In such arrangement, the optical apparatus 200 can be avoided from image ghosting. By controlling the image beam to obliquely enter the light guiding module 25, an angle between the light exiting plane of the light engine (e.g. the light exiting plane 355 of the second lens unit 235 that is perpendicular to the lens optical axis L5) and the incident plane 251 of the light guiding module 25 can be drastically reduced, so as to reduce the volume.

In yet another embodiment, the above-described second lens unit 235 and the light guiding module 25 can be modified, so that the central optical axis F of the image beam that enters the second lens unit 235 intersects the lens optical axis L5 of the second lens unit 235. In such arrangement, the image beam leaving the second lens unit 235 obliquely enters the light guiding module 25.

As described above, the appearance of image ghosting can be avoided by the design of the illuminating module or by the arrangement of the optical modulation module and the light guiding module. However, the invention is not limited thereto. That is to say, after reading the above disclosure, the person having ordinary skill in the art can use one or more above-described embodiments according to the actual requirements to avoid or reduce the image ghosting.

For example, the illuminating module 21 of FIG. 4 can be substituted by the illuminating module 11 of FIG. 2 (or the illuminating module 11' of FIG. 3). Alternatively, the illuminating module 21 can be obliquely disposed with respect to the optical modulation module 23. That is to say, the central axis D of the illuminating module 21 or the central optical axis E of the illuminating beam is sloped at an angle with respect to the normal line of the incident plane 333 of the optical modulation module 23 that faces the illuminating module 21.

In one or more embodiments of the invention, the optical apparatus can be a head-mounted display or projected display that allows the user to wear on the head. In such arrangement, the image beam outputted by the light guiding module can be projected to user's eyes, so that the user can view the image that is presented by the optical apparatus. Therefore, the light guiding module of the invention is provided with a light exiting plane that allows the image beam to be outputted and faces the user. Also, relative position of the light exiting plane and the incident plane of the light guiding module that allows the image beam to enter can be designed according to actual application. For example, the light exiting plane and the incident plane can be arranged on the same side of the light guiding module, can be arranged on two opposite sides of the light guiding module or can be arranged on two adjacent sides of the light guiding module.

In one or more embodiments of the invention, each lens unit can be designed according to actual application. For example, one lens unit can include one or more lenses which constitute a lens optical axis.

In one or more embodiments of the invention, the collimated element can be designed according to actual application. For example, the collimated element can be a lens unit including one or more lenses which constitute a lens optical axis.

In one or more embodiments of the invention, the light source can be a laser diode or light emitting diode, the light uniformizer can be a lens array or light guiding cylinder, the light valve 131 can be an LCoS (Liquid Crystal on Silicon) reflective panel or digital micromirror device, the beam combiner 133 can be polarization beam splitter or total internal reflection prism, and the light guiding module 15 can include a diffracted light guiding plate and/or a polarized light guiding plate. However, the invention is not limited to those implementations. Person having ordinary skill in the art can refer to the description of the invention to select appropriate components according to actual requirement.

What is claimed is:

1. An illuminating module for an optical apparatus, comprising:
   a light source assembly comprises a first lens unit and is configured to produce an illuminating beam;
   wherein the first lens unit has a first lens optical axis;
   wherein an axis passes through the first lens unit and is perpendicular to the first lens optical axis;
   wherein the optical apparatus comprises an optical modulation module and a light guiding module, the optical modulation module comprises an incident plane which is parallel to the axis passing through the first lens unit, the illuminating beam passes through the optical modulation module to be an image beam having an image, and the image beam travels in the light guiding module, and leaves the light guiding module;
   wherein the illuminating beam obliquely enters the optical modulation module.

2. The illuminating module as claimed in claim 1, wherein the illuminating beam obliquely enters the optical modulation module so that the image beam obliquely enters the light guiding module.

3. The illuminating module as claimed in claim 2, wherein the light source assembly has a light source, the light source is configured to produce a light beam which has a central optical axis, the light beam passing through the first lens unit is formed to be the illuminating beam which has another central optical axis, the first lens optical axis intersects with the central optical axis at a point or the first lens optical axis and the central optical axis are in parallel without coinciding with each other so that the another central optical axis is angled with respect to the first lens optical axis.

4. The illuminating module as claimed in claim 3, wherein an angle at which the another central optical axis is angled with respect to the first lens optical axis satisfies the following condition:

3 degrees≤θ≤8 degrees, where θ is the angle at which the second central optical axis intersects with the first lens optical axis.

5. The optical apparatus as claimed in claim 2, wherein the optical modulation module further comprises a second lens unit, the second lens unit has a second lens optical axis, the image beam outputted by the optical modulation module has a third central optical axis, and the second lens optical axis and the third central optical axis are in parallel and are spaced a distance on the incident plane or intersect with each other.

6. The optical apparatus as claimed in claim 5, wherein when the second lens optical axis and the third central optical axis are in parallel and are spaced the distance on the incident plane, the distance satisfies the following condition:

$\alpha = \tan^{-1}(S/G)$, where α is an incident angle at which the image beam enters the light guiding module, S is the distance at which the second lens optical axis and the third central optical axis are spaced, and G is a focal length of the second lens unit; and the incident angle satisfies the following condition:

0 degrees<α<90 degrees, where α is the incident angle at which the image beam enters the light guiding module.

7. The optical apparatus as claimed in claim 6, wherein the incident angle satisfies the following condition:

0 degrees<α<10 degrees, where α is the incident angle at which the image beam enters the light guiding module.

8. The optical apparatus as claimed in claim 7, wherein the incident angle satisfies the following condition:

0 degrees<α<1.5 degrees, where α is the incident angle at which the image beam enters the light guiding module.

9. The illuminating module as claimed in claim 5, wherein the light source assembly further comprises:

a collimated element configured to collimate light to be a collimated beam;

a light uniformizer configured to uniformize the collimated beam to be a light beam;

a light valve configured to add image information to the illuminating beam to produce the image beam; and a beam combiner configured to guide the illuminating beam from the illuminating module to the light valve and guide the image beam from the light valve to the second lens unit;

wherein the second lens unit is configured to allow the image beam to pass through and project the image beam to the light guiding module, and the light guiding module comprises a diffraction-type light guiding plate.

10. The illuminating module as claimed in claim 1, wherein the light source assembly further comprises a third lens unit which has a central optical axis; and wherein the first lens optical axis intersects with the central optical axis at a point or the first lens optical axis and the central optical axis are in parallel without coinciding with each other so that the illuminating beam obliquely enters the optical modulation module.

11. The illuminating module as claimed in claim 10, wherein the illuminating beam obliquely enters the optical modulation module so that the image beam obliquely enters the light guiding module.

12. The illuminating module as claimed in claim 11, wherein the light source assembly further comprises a light source which is configured to produce a light beam, the light beam passing through the first lens unit is formed to be the illuminating beam, the another central optical axis of the illuminating beam is angled with respect to the first lens optical axis and satisfies the following condition:

3 degrees≤θ≤8 degrees, where θ is an angle at which the another central optical axis intersects with the first lens optical axis.

13. The optical apparatus as claimed in claim 10, wherein the optical modulation module further comprises a second lens unit, the second lens unit has a second lens optical axis, the image beam outputted by the optical modulation module has a third central optical axis, and the second lens optical axis and the third central optical axis are in parallel and are spaced a distance on the incident plane or intersect with each other.

14. The optical apparatus as claimed in claim 13, wherein when the second lens optical axis and the third central optical axis are in parallel and are spaced the distance on the incident plane, the distance satisfies the following condition:

$\alpha = \tan^{-1}(S/G)$, where α is an incident angle at which the image beam enters the light guiding module, S is the distance at which the second lens optical axis and the third central optical axis are spaced, and G is a focal length of the second lens unit;

and the incident angle satisfies the following condition:

0 degrees<α<90 degrees, where α is the incident angle at which the image beam enters the light guiding module.

15. The optical apparatus as claimed in claim 14, wherein the incident angle satisfies the following condition:

0 degrees<α<10 degrees, where α is the incident angle at which the image beam enters the light guiding module.

16. The illuminating module as claimed in claim 15, wherein the incident angle satisfies the following condition:

0 degrees<α<1.5 degrees, where α is the incident angle at which the image beam enters the light guiding module;

wherein the light source assembly further comprises:

a light source configured to emit light which is collimated by the collimated element to be a collimated beam;

a light uniformizer configured to uniformize the collimated beam to be a light beam;

a light valve configured to add image information to the illuminating beam to produce the image beam; and a beam combiner configured to guide the illuminating beam from the illuminating module to the light valve and guide the image beam from the light valve to the second lens unit;

wherein the second lens unit is configured to allow the image beam to pass through and project the image beam to the light guiding module, and the light guiding module comprises a diffraction-type light guiding plate.

* * * * *